INVENTOR
HIROTOSHI SHIRASU
TADAHIKO AKIYAMA

BY Paul M. Craig, Jr.
ATTORNEY

May 7, 1968 HIROTOSHI SHIRASU ET AL 3,382,324

MULTISTAGE CONNECTION COMMON CONTROL SWITCHING SYSTEM
HAVING IDLE STATE INDICATING MEANS

Filed June 28, 1965 4 Sheets-Sheet 2

INVENTORS
HIROTOSHI SHIRASU
TADAHIKO AKIYAMA

BY Paul M. Craig, Jr.
ATTORNEY

INVENTORS
HIROTOSHI SHIRASU
TADAHIKO AKIYAMA

BY Paul M. Craig, Jr.
ATTORNEY

INVENTORS
HIROTOSHI SHIRASU
TADAHIKO AKIYAMA

BY Paul M. Craig, Jr.
ATTORNEY 3,382,324
MULTISTAGE CONNECTION COMMON CONTROL SWITCHING SYSTEM HAVING IDLE STATE INDICATING MEANS Hirotoshi Shirasu and Tadahiko Akiyama, Yokohama, Japan, assignors to Hitachi, Ltd., Tokyo, Japan Filed June 28, 1965, Ser. No. 467,294
Claims priority, application Japan, June 29, 1964, 39/36,352
1 Claim. (Cl. 179—22)

This invention relates to automatic switching systems and particularly to those of the multistage-connection common-control type which have a frame arrangement including a plurality of switching frames in multiple connection with each other and each having routing paths for interconnection between incoming and outgoing lines. The present invention has for its object to enhance the traffic efficiency of this type of automatic switching system without necessitating any complicated arrangement.

To enable the invention to be clearly understood description will now be made with reference to the accompanying drawings, in which.

Figure 1:
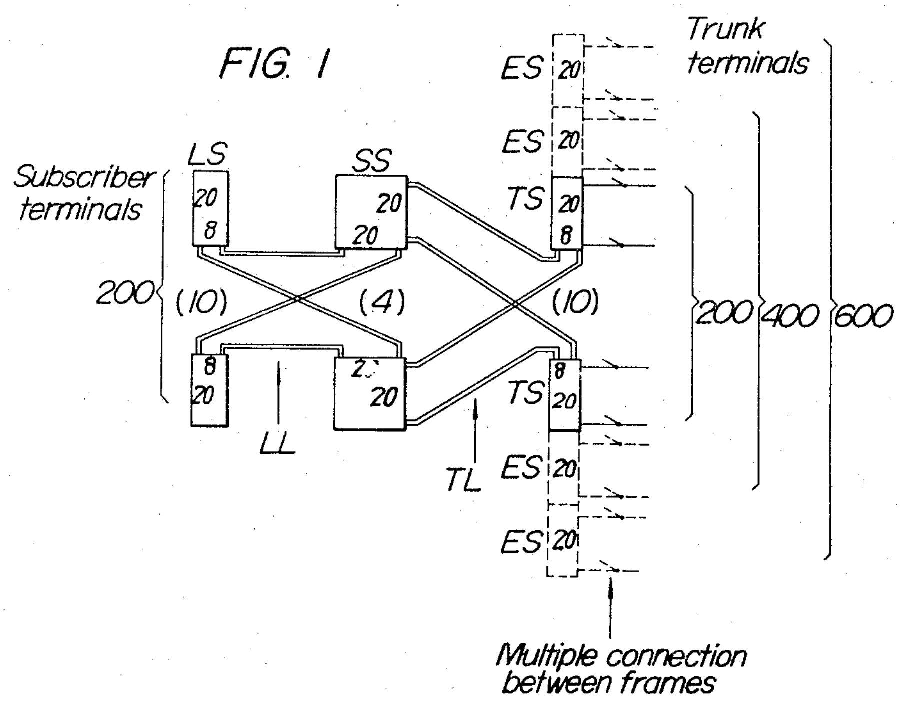
FIG. 1 is a diagram of a conventional three-stage connection frame consisting of crossbar switches.

Referring first to FIG. 1, there is shown a conventional switching frame of three-stage connection which comprises primary lattices or switches LS, secondary lattices SS and tertiary lattices TS and also primary links LL interconnecting the primary and secondary lattices and secondary links TL interconnecting the secondary and tertiary lattices, and which has 200 subscriber terminals and 200 trunk terminals. In case the number of subscribers to be served exceeds 200, an appropriate number of such frames are used and multiple connection is made therebetween on their trunk terminals. By doing this, the total number of subscriber terminals can be increased to obtain any greater accommodation required. For the number of trunks exceeding 200, however, extension lattices ES are arranged in multiple connection in the vertical paths of the tertiary lattices TS in each of the switching frames, as seen in dotted lines in FIG. 1, since generally the trunks must be connectible with any of the subscribers accommodated.

Figure 2:
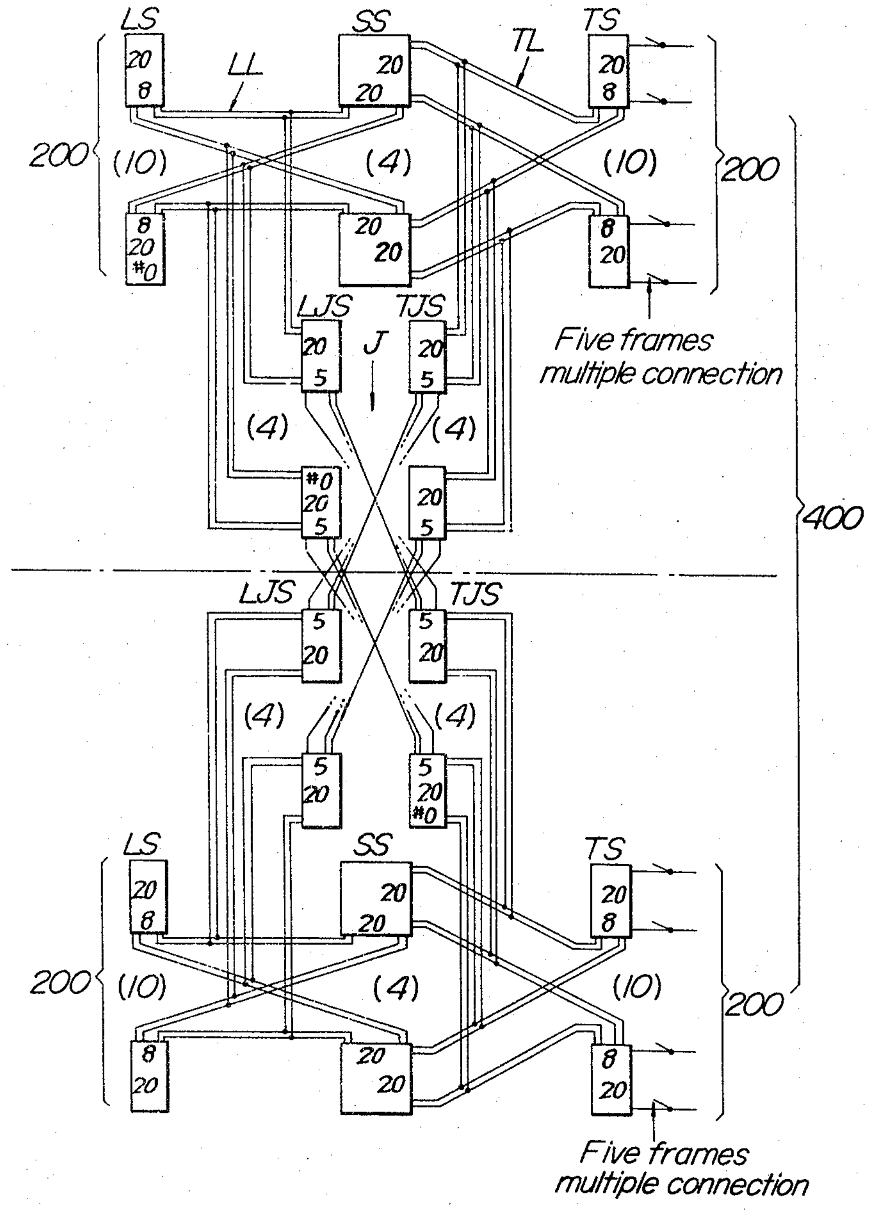
FIG. 2 is a diagram of a frame including three- and four-stage connections.

In FIG. 2, which illustrates an exchange unit including ten three-stage connection switching frames each having 200 subscriber terminals, the ten three-stage connection switching frames are classed into two groups FG0 and FGI, in each of which the trunk terminals or outgoing lines of the tertiary lattices TS are multiple-connected between the five grouped frames. Further, in order to make any of the subscribers connectible to any of the trunks, two crossbar switches each having twenty vertical paths and twenty horizontal paths are used in each of the switching frame to serve as four primary junctor lattices LJS and four secondary junctor lattices TJS, the twenty vertical paths in each of the crossbar switches being, of course, divided into four groups. More specifically, in each frame, the primary junctor lattices LJS each have twenty horizontal paths accommodating every two primary links LL for each primary lattice LS. Similarly, the secondary junctor lattices TJS each have twenty horizontal paths accommodating every two secondary links TL for each tertiary switch TS. Further, a junctor J is used to interconnect the vertical paths of the primary junctor lattices LJS and those of the secondary junctor lattices TJS between the different frame groups. The term "junctor" as referred to herein thus means a link interconnecting the primary and secondary junctor lattices. To describe the connection of the junctor J more specifically, the five vertical paths, for example, of the primary junctor switch LJS#0 of the illustrated frame in group FG0 are accommodated by the respective five vertical paths of the secondary junctor switches TJS#0 of the five switching frames in group FGI.

By use of such interconnection, the number of trunk terminals can be increased to 400 and all the subscribers can be routed to any of the trunks through three-stage connection between the subscribers and trunks accommodated in one and the same frame group and through four-stage connection between the subscribers and the trunks accommodated in the two different frame groups.

The present invention is designed to provide in the frame arrangement shown in FIG. 1 means for selecting a trunk having one or more idle channels to the calling party and also, for example, with the frame arrangement shown in FIG. 2, to provide means for selecting the trunk side frames having one or more idle channels to the calling party for four-stage connection between the two distinct frame groups.

With the frame arrangement including link connections as shown in FIGS. 1 and 2, it is known that in selecting the outgoing lines it is possible to substantially reduce the link connection and enable efficient use of the outgoing lines by matching selection between the incoming line and the links and outgoing lines to select an outgoing line having one or more idle channels. Actually, in a telephone exchange employing multiple connection between switching frames, as shown in FIG. 1, in two-stage connection, the matching selection is performed by the so-called recycling method.

The present invention is concerned with means of selecting an outgoing line having one or more idle channels without use of the recycling method and, for a frame arrangement including routing paths connected in parallel to a plurality of switching frames, means of selecting an outgoing line having one or more idle channels and selecting a frame including such idle channel for the outgoing line.

The present invention will next be described in detail with particular reference to FIG. 2. Apparently, the frame arrangement of FIG. 2 includes as its part the frame arrangement of FIG. 1.

With the frame arrangement of FIG. 2, when it is desired to interconnect a subscriber and a trunk accommodated in the respective distinct frame groups by way of the junctor J, each junctor of the primary junctor switch in the frame accommodating the subscriber is distributed to the corresponding secondary junctor lattices in the five frames forming a group associated with the desired trunk. It is to be noted that these five frames each include a path to the trunk due to the inter-frame multiple connection of the trunk terminals. Thus, the frame accommodating the subscriber can be identified singularly but the trunk side frame cannot be determined singularly since in the frame group including the desired trunk each of the frames includes a routing path between the subscriber and the trunk. To meet this situation, the following two procedures can be followed. In the first procedure, the trunk side frame including an idle path can be selected after examining the presence or absence of an idle path utilizable for interconnection between the subscriber and the trunk. In an alternative procedure, any one of the five trunk side frames is first taken to check the presence or absence in the frame of an idle path utilizable for interconnection between the subscriber and the trunk and if no idle path is found, the trunk side frame just examined is released and another trunk side frame is caught by well-known recycling means to examine the presence or absence of an idle routing path in the second trunk side frame. Such recycling must be repeated as many as four times at the worst to find out an idle routing path.

The latter procedure, necessarily involving some increases in the number of useless calls to the frames and in the holding time of the marker, is subject to many limitations from the practical viewpoint. According to the present invention, a novel switching system is provided which is operable upon the basis of the former selecting procedure.

Figure 3:
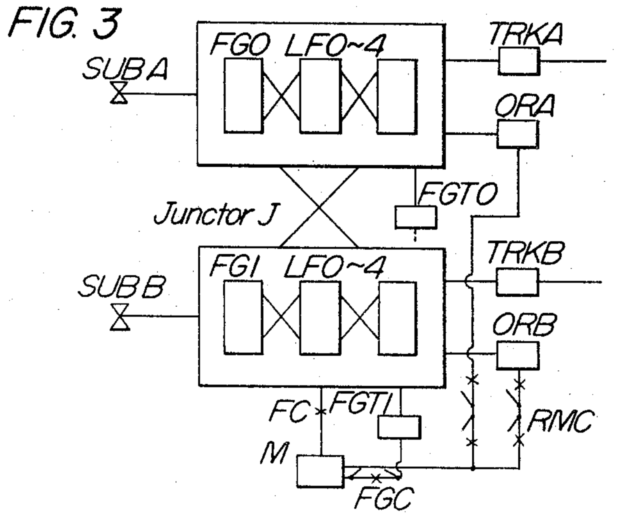
FIG. 3 is a trunking diagram of an automatic switching system according to the present invention and including the frame arrangement shown in FIG. 2.

Reference will next be made to FIG. 3, which represents a trunking diagram of a crossbar switching system embodying the present invention. In this figure, boxes FGO LF0–4, FGI LF0–4 and junctor J schematically represent the frame shown in FIG. 2.

Now assume that a subscriber SUBA takes up his telephone handset. Then the marker M is started and, identifying the accommodating position of the calling subscriber SUBA, catches one of channel busy testers FGT0 for testing the channels between the subscriber and trunk terminals. Such testers FGT are provided one for each of frame groups FG0 and FG1 for the purpose of testing channels through the associated frame group.

Also, the marker M acts to idle-test the originating register ORA, accommodated in the frame group FG0, to collate the result with that of the channel testing, and, if they are found matching, catches the originating register ORA. On this occasion, the accommodating position of the calling subscriber is transmitted from the marker M to the originating register ORA to be stored therein. It has now been found that there exists an idle channel between the caught register and the calling party and connection is made therebetween by the conventional method. With a dial tone sent from the originating register ORA to the calling subscriber SUBA, the latter starts dialling. Upon completion of the dialling, the originating register ORA operates to start the marker M through the medium of a register-marker connector RMC. Subsequently, the connection of the calling subscriber SUBA is changed to the trunk TRKA in the same manner as previously connected to the originating register ORA and the latter is restored.

Though the above description has been made in connection with the three-stage connection, the trunk selection through the four-stage connection is effected as follows. When the marker M collates the result of the channel test with that of the idle test of the originating register ORA, as described above, if the two results mismatch each other, the marker releasing the tester FGT0 now catches tester FGT1 to perform a channel test and make an idle test on originating register ORB for collation. After the trunk selection, tester FGT1 is employed to select a trunk side frame having an idle channel and the subscriber SUBA is connected to the originating register ORB.

After completion of the dialling, the calling subscriber SUBA is connected to the trunk TRKB, as in the three-stage connection described hereinbefore.

Operation of selecting trunks and trunk side frames will next be described in detail with reference to FIGS. 4 and 5 particularly with respect to the outgoing connection to the trunks TRKA and TRKB.

Figure 4:
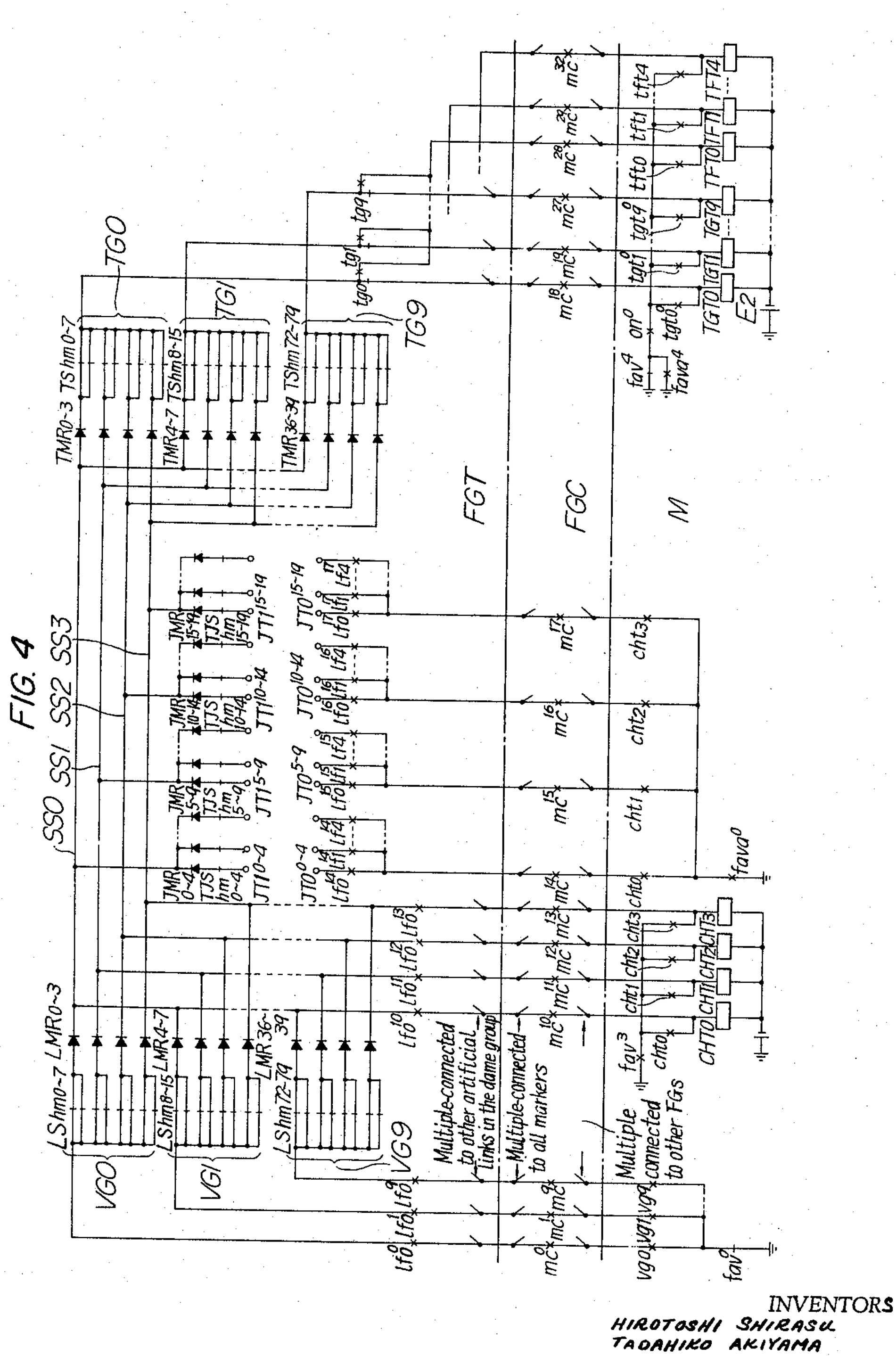
FIGS. 4 and 5 is a circuit diagram illustrating one embodiment of the present invention, including an arrangement for connection control of the frame arrangement shown in FIG. 2.
Figure 5:
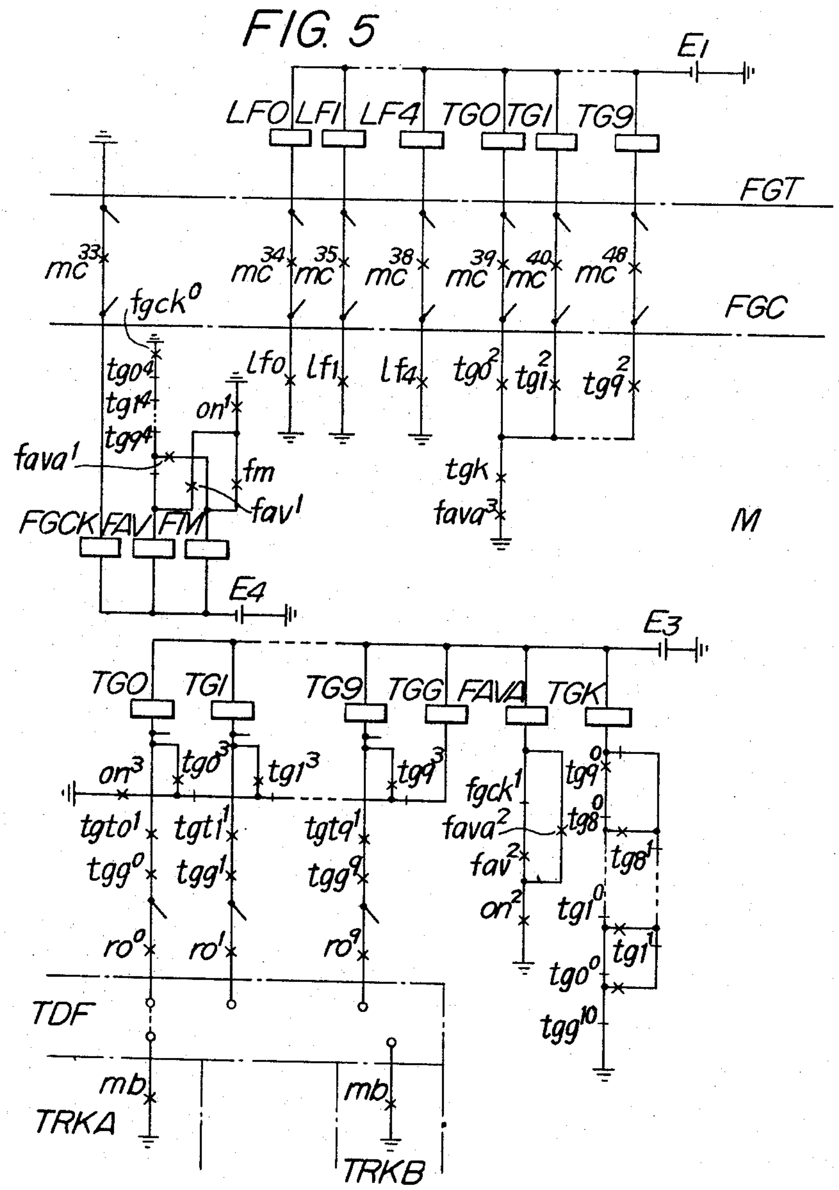

Referring to FIGS. 4 and 5, the frame group test FGT represents apparatus for checking idle paths in the frames and such apparatus are provided one for each frame group FGO or FGI. The frame group connector FGC is a connector for interconnection between the above-mentioned frame group test FGT and marker M. In the frame group test, reference characters LS*hm*0–LS*hm*79 indicate the break contacts of the vertical path mechanical contacts in the crossbar switches used as the primary lattices LS in FIG. 2 and the opening of the contacts represents the busy or engaged state of the primary link. The ten primary lattices LS in any one frame in FIG. 2 are called vertical groups VG0–VG9 for convenience. Similarly, reference characters TS*hm*0–TS*hm*79 indicate the mechanical contacts of the crossbar switches used as the tertiary lattices TS in FIG. 2 and their opening represents the busy state of the secondary link TL, the ten tertiary lattices TS being indicated by TG0–TG9, respectively. Reference characters TJS*hm*0–TJS*hm*19 indicate the break mechanical contacts of a crossbar switch used as the secondary junctor lattices TJS and the opening of the contacts represents the busy state of the junctor J. The four secondary junctor lattices are indicated by TJS0–TJS3, respectively.

Reference characters LMR0–79, TMR0–79 and JMR0–JMR19 indicate rectifiers provided for prevention of the "roundabout" current.

In the frame group test FGT described above, the circuitry including the mechanical contacts of the crossbar switches and the rectifiers corresponds to the distribution of the link connections in the frame arrangement of FIG. 2 and is conveniently referred to as an artificial link network.

The operation of the switching system shown in FIGS. 4 and 5 will next be described with particular reference to outgoing connections. With this embodiment, not only in selecting the trunk side frame including an idle path to establish a four-stage connection, as described hereinbefore, but also in trunk selection, such selection is performed while confirming the presence of an idle path utilizable for connection between the calling subscriber and the desired trunks. The following description is made separately for the three- and four-stage connection.

*Three-stage connection*

Let it be assumed that the calling subscriber is accommodated in the primary lattice LS#0 of the illustrated frame in the frame group FG0 of FIG. 2. In the arrangement of FIGS. 4 and 5, the marker M operates to receive the information concerning the accommodation position of the calling subscriber from the originating register OR, closing the contact *lf*0 in FIG. 5 and contact *vg*0 in FIG. 4. On the other hand, on receipt of the dialed numbers, the marker M identifies the kind of trunk to be connected with the calling party and operates a route relay, such as R0 (not shown), to close its contacts $r0^0$–$r0^9$ (see FIG. 5) and further, in a circuit not shown, acts to start the frame group connector FGC thereby to close the connector contacts $mc^0$–$mc^{48}$ in FIGS. 4 and 5 to get hold of the frame group test FGT. Thus, in FIG. 5, the relay LFO in the frame group test FGT is operated through the circuit including battery E1, relay LF0, contact $mc^{34}$ contact *lf*0 and ground, in that order. Thus, the ground passing the break contact $fav^0$ in FIG. 4 is led through make contact *vg*0 and connector contact $mc^0$ and further through the contact $lf0^0$ of the relay LF0 just actuated to mechanical contacts LShm0–LShm7. These mechanical contacts correspond to the eight primary links LL accommodated in the vertical group VG0 of the primary lattices LS which includes the calling subscriber and non-operation of any contact indicates the idle state of the associated link so that the ground is directed to rectifiers LMR0–LMR3 through the idle links.

These rectifiers are connected to leads SS0–SS3 corresponding to the four secondary lattices in FIG. 2 and the fact that any of the leads SS0–SS3 is at the ground potential indicates the presence of an idle primary link between the calling party and the secondary lattice corresponding to the lead. Further, the leads SS0–SS3 are connected through rectifiers TMR0–TMR39 to the corresponding ones of the vertical path mechanical break contacts TS*hm*0–TS*hm*79 of the crossbar switches indicating the idle state of all the secondary links TL.

With the other side of these contacts are multiple-connected mechanical contacts corresponding to the eight secondary links for each of the trunk groups corresponding to the tertiary lattices. Accordingly, the ground reaching the leads SS0–SS3 passes through rectifiers TMR0–39 and the mechanical break contacts TS*hm* corresponding to the idle secondary link TL to appear only on the lead corresponding to the trunk group including an idle path from the calling subscriber. Such ground, passing through the break contacts *tg0–tg9* and connector contacts $mc^{18}$–$mc^{27}$ to cause the corresponding one of the relays TGT0–TGT9 in the marker M indicating the trunk group to be operated by the battery E2. Operation of some of the relays TGT0–9 indicates the fact that as long as a trunk is selected from the corresponding group of trunks an idle channel is found available to interconnect the trunk with the calling subscriber. For example, in case relay TGT0 is operated to indicate the presence of an idle path in the trunk group #0, a busy test is conducted in FIG. 5 on the trunks in the group. In other words, since relay TGG has been operated through the circuit including the ground, make contact $on^3$, break contacts $tg0^3$, . . . $tg9^3$ and battery E3, a relay, TG0, for example, is operated as long as the trunks in the trunk group #0 corresponding to the route indicated by contacts $r0^0$–$r0^9$ include an idle one. The operating circuit in this case includes the battery E3, relay TG0, contacts *tgt0'*, $tgg^0$, relay contact $r0^0$ indicating the connecting route, jumpered wire on the trunk distributing frame TDF, contact *mb* of the idle-indicating relay of the trunk TRKA and the ground. Operation of relay TG0 interrupts by way of its break contact $tg0^3$ the operating circuit for relay TGG while forming a self-holding circuit by way of the make contact $tg0^3$. Depending upon the condition of the trunks and links, two or more of the relays TG0–TG9 may be operated. Operation of the relays TG0–TG9 permits the relay TGG to be restored interrupting the operating circuits for all the relays TG0–TG9 to hold the relay TG0 alone and cause the check relay TGK to operate. In this manner, selection of the trunk group which includes an idle trunk having an idle channel is completed. During the three-stage connection since all the connections are effected only in the frame accommodating the calling subscriber, operation of relay TGK immediately releases the frame group test FGT, making it possible to make selection by means of well-known trunk-selecting and link selecting circuits. In FIG. 4, the circuit including the mechanical contacts LS*hm*0–79 indicating the idleness of the primary links LL and the rectifiers LMR0–79 may be omitted in case the eight links connectible with the calling subscriber are tested by the marker M since theh secondary lattice SS including an idle path can be identified by the marker M.

*Four-stage connection*

In FIG. 5, when the marker M operates to catch the frame group test FGT, the relay FGCK for ensuring the closing of frame group connector FGC operates through the closing of the connector contact $mc^{33}$. The marker M identifies the fact that the trunk group selecting operation has been started by the operation of relay FGCK and, connects the circuit of the timing relay FAV to the earth through contact $fgck^0$ to see if none of the relays TG0–TG9 be operated within the definite time limit. Occurrence of TG0–TG9 relay operation indicates the fact that an idle trunk having an idle path has been selected, as with the case of the three-stage connection described hereinbefore. Thus, upon operation of anyone of the relays TG0–TG9 the time-limit supervision is interrupted and the operating circuit of the relay FAV is cut for the next connecting operation. In case none of the relays TG0–TG9 has operated within the time limit, which indicates that the frame group includes no trunk having an idle channel, relay FAV (FIG. 5) is operated and held to identify the number of that secondary lattice in the frame accommodating the calling subscriber which has an idle path available for interconnection with the calling subscriber by means of relays CHT0–CHT3 in the marker M of FIG. 4, the relays being held in actuated position through the contact $fav^3$. At the same time, the starting circuit (not shown) for the frame group connector FGC associated with the calling subscriber is opened to restore the connector, the restoring of the connector relay being confirmed by the restoring of relay FGCK in FIG. 5. Upon restoring of the relay FGCK, relay FAVA is operated through the circuit including the battery E3, relay FAVA, break contact $fgck^1$, make contacts $fav^2$ and $on^2$ and the ground (see FIG. 5). The relay FAVA immediately starts a frame group connector to catch a frame group test corresponding to the other frame group FG1. The frame group connector and frame group test corresponding to frame group FG1 is identical with the frame grocp test FGT as shown in FIGS. 4 and 5 and, therefore, the following description is made with reference thereto. Referring to FIG. 5, the closing of the frame group connector FGC causes through contacts $mc^{34}$–$mc^{38}$ operation of one of the relays LF0–LF4 which represents the number of the frame accommodating the calling subscriber in the frame group and which in this case is relay LF0 upon the assumption initially made.

Upon operation of relay LF0, the ground potentitl passing through contact $fava^0$ in FIG. 4 is directed through the contacts *cht0–cht3* of relays CHTO–CHT3, which have operated to memorize the idle primary link of the frame accommodating the calling party, as described hereinbefore relative to the three-stage connection, and through connector contacts $mc^{15}$–$mc^{17}$ and contacts $lf0^{14}$–$lf0^{17}$ to reach lower jumper terminals $JT0^0$–$JT0^{19}$, which are provided in correspondence to all the primary junctor lattices LJS of the frame group FG0 accommodating the calling subscriber. The upper terminals $JT1^0$–$JT1^{19}$ in FIG. 4 are provided to correspond to all the junctors of the frame group FG1 now under trunk selection. In the drawing, only such terminals for one frame are shown, those for the remaining four frames being omitted for simplicity's sake. The upper and lower terminals are jumpered according to the pattern of junctor distribution described hereinbefore with reference to FIG. 2. Thus, for example, the terminal $JT0^0$ corresponding to contact $lf0^{14}$ is jumpered to the terminal JT1, which corresponds to the mechanical contacts TJS*hm*0 of all the five frames in the frame group FG1. Similarly, the contacts $lf0^{15}$ and $lf0^{17}$ are jumpered respectively to the mechanical contacts TJS*mh*5 and TJ*mh*15 of all the frames in the frame group FG1. The ground potential corresponding to the primary junctor lattice having an idle path is directed through the jumper connection and through the crossbar switch mechanical contacts TJS*hm*0–19, which indicate the idle junctor state, to flow through rectifiers JMR0–19, TMR0–39 and crossbar switch mechanical contacts TS*hm*0–79 to appear only in the trunk group having an idle path connectible with the calling subscriber. The ground potential causes the relays

TGT0–TGT9 in the marker M to be operated and held and subsequently specifies one of the trunk groups TG0–TG9 as in the selection within one and the same frame group for three-stage connection. For four stage connection, however, since all the five frames include secondary links TL to be used for interconnection even after a trunk group has been selected, it is required further to select a frame including an idle path.

In FIG. 5 assume that the trunk group relay TG0 is operated for selection. Then, check relay TGK is operated to operate the relay TG0 in the frame group test FGT through the circuit including the ground, make contacts $fava^3$, *tgk*, $tg0^2$, connector contact $mc^{39}$, relay TG0 and a battery. This causes the contact *tg*0 in FIG. 4 to operate and the leads corresponding to the trunk groups #0 in the respective frames are switched to examine the presence or absence of any idle path in each of the frames. In orther words, the ground potential passing through the mechanical contacts TS*hm*0–7 is switched over to make contact *tg*0 and connector contacts $mc^{28}$–$mc^{32}$ to cause operation of one of the frame test relays TFT0–TFT4 in the marker M which corresponds to the frame having an idle channel. The marker M selects the operated one of the relays TFT0–TFT4 to catch the frame thus selected and seizes the frame accommodating the calling subscriber. Subsequently, the connection can be completed by the well-known method of controlling four-stage connection frames.

If no idle trunk having any idle channel has been found to be connected with the calling party even at the end of the above-described testing and selecting procedure for four-stage connection, the relay FM (FIG. 5) in the marker M is operated through the circuit including the battery E4, relay FM, make contact $fava^1$, break contacts $tg9^4$–$tg0^4$, make contact make contact $fgck^0$ and the ground so that the marker M is caused to cease its connection operation and operates to send a busy tone to the calling subscriber.

Description has been made herein on the operation of the inventive switching system particularly in connection with calls from customers. The three-stage connection for an incoming call may be established by a suitable known procedure while the four-stage connection for such call necessitates selection of a frame including an idle channel. In this case, since the trunk group including the incoming trunk is previously known, it is possible to select a frame including an idle channel by the same procedure as described above in connection with the call from a subscriber served by the same exchange by operating one of the trunk group relays TG0–TG9 provided in the frame group test FGT in advance. Though in the above-described procedure the frame group test FGT is caught without confirming the presence or absence of any idle trunk in the frame group, in which the calling subscriber is accommodated, and, in case no idle trunk is found in the frame group, the recycling method is followed as described hereinbefore, it is also possible to select only a frame group including an idle trunk by conducting trunk busy tests in advance with each of the frame groups. In this case, the ineffective operation of the common frame group test FGT can apparently be minimized.

What is claimed is:

1. A multistage-connection common-control type autotatic switching system having a frame arrangement including a plurality of switching frames in multiple connection with each other and each including routing paths for interconnection between incoming and outgoing lines, said system comprising an artificial link network arranged in common to the plurality of frames in multiple connection and corresponding to the link arrangement with rectifiers connected in series with the break contacts which indicate the idle state of the links.

References Cited

UNITED STATES PATENTS

| | | | |
|---|---|---|---|
| 3,308,242 | 3/1967 | Erwin | 179—22 |
| 3,317,676 | 5/1967 | Ekbergh et al. | 179—22 |

WILLIAM C. COOPER, *Primary Examiner.*

L. A. WRIGHT, *Assistant Examiner.*